(12) United States Patent
Chang

(10) Patent No.: US 6,688,706 B2
(45) Date of Patent: Feb. 10, 2004

(54) HYDRAULIC PRESSURE CONTROL APPARATUS FOR A BRAKE SYSTEM OF A VEHICLE

(75) Inventor: Eu-Gene Chang, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/116,089

(22) Filed: Apr. 2, 2002

(65) Prior Publication Data
US 2002/0180261 A1 Dec. 5, 2002

(30) Foreign Application Priority Data
May 29, 2001 (KR) ........................................ 2001-29695

(51) Int. Cl.⁷ ................................................ B60T 8/42
(52) U.S. Cl. .................... 303/115.4; 303/11; 303/117.1
(58) Field of Search ................ 303/114.1, 10, 303/11, 117.1, 116.2, 115.4

(56) References Cited

U.S. PATENT DOCUMENTS

| | | | | |
|---|---|---|---|---|
| 4,453,782 A | * | 6/1984 | Arikawa et al. ......... 303/116.1 |
| 4,728,155 A | * | 3/1988 | Resch ...................... 303/114.1 |
| 4,765,692 A | * | 8/1988 | Miyake .................... 303/115.4 |
| 4,877,296 A | * | 10/1989 | Leiber et al. ............ 303/113.4 |
| 4,941,712 A | * | 7/1990 | Hirobe .................... 303/115.4 |
| 5,290,098 A | * | 3/1994 | Burgdorf et al. ......... 303/115.4 |
| 5,378,055 A | * | 1/1995 | Maas et al. .............. 303/113.1 |
| 5,655,818 A | * | 8/1997 | Ozawa et al. ............ 303/115.1 |

* cited by examiner

Primary Examiner—Jack Lavinder
Assistant Examiner—Mariano Sy
(74) Attorney, Agent, or Firm—Pennie & Edmonds LLP

(57) ABSTRACT

In order to improve precision and reliability of a hydraulic pressure control apparatus for a brake system of a vehicle, this invention provides a hydraulic pressure control apparatus for a brake system of a vehicle including a control unit for controlling operation of the hydraulic pressure control apparatus, a pressurized fluid generating unit for pressurizing brake fluid and supplying the pressurized fluid, and a hydraulic pressure distributing unit for mechanically selecting and transmitting at least one of hydraulic pressure of the pressurized fluid supplied from the pressurized fluid generating unit and hydraulic pressure supplied from a master cylinder of the brake system to a wheel brake cylinder of the brake system.

15 Claims, 2 Drawing Sheets

HYDRAULIC PRESSURE CONTROL APPARATUS FOR A BRAKE SYSTEM OF A VEHICLE

FIELD OF THE INVENTION

The present invention relates to a brake system of a vehicle, and more particularly, to a hydraulic pressure control apparatus for a brake system of a vehicle.

BACKGROUND OF THE INVENTION

Recent progress in the field has provided vehicles with a distance control system for automatically controlling a distance to a vehicle ahead. Such a distance control system must include an apparatus, that is, a brake system, for reducing the speed of a vehicle, and a variety of brake systems have been investigated.

Typically, a brake system for a distance control system utilizes a hydro-vacuum apparatus, where the hydro-vacuum apparatus generates, or more specifically amplifies, hydraulic pressure for braking owing to pressure difference between a surge tank and atmosphere. A solenoid valve is adopted to control a consequent deceleration of the vehicle according to control of an electronic control unit. Such a brake system using a hydro-vacuum apparatus usually shows slow response and bad precision because the surge tank pressure depends on various circumstantial factors.

Another type of brake system provided with a hydraulic control apparatus between a master cylinder and a brake cylinder of a wheel has also been developed.

However, such a type of brake system has an excessively complicated hydraulic line structure because of many electrically controlled solenoid valves and check valves, and therefore its control logic is also much too complicated.

SUMMARY OF THE INVENTION

The present invention provides a hydraulic pressure control apparatus for a brake system of a vehicle where hydraulic pressure supplied to a brake cylinder of a wheel is more mechanically controlled, such that reliability of hydraulic pressure control is improved and cost of manufacturing the brake system is reduced. According to one embodiment of the present invention, a hydraulic pressure control apparatus for a brake system of a vehicle includes a control unit for controlling operation of the hydraulic pressure control apparatus, a pressurized fluid generating unit for pressurizing brake fluid and supplying the pressurized fluid, and a hydraulic pressure distributing unit for mechanically selecting and transmitting at least one of hydraulic pressure of the pressurized fluid supplied from the pressurized fluid generating unit and hydraulic pressure supplied from a master cylinder of the brake system to a wheel brake cylinder of the brake system.

The hydraulic pressure distributing unit preferably includes a pressure chamber for receiving pressurized fluid from the pressurized fluid generating unit; a distributing chamber adjoining the pressure chamber, to which a master cylinder is connected by a first port and a brake cylinder is connected by a second port; and a spool disposed in the distributing chamber for transmitting hydraulic pressures of the pressure chamber and the master cylinder to the second port.

The spool is operated by pressure of the pressure chamber and an elastic force of a first elastic member abutted against an inside portion of the distributing chamber. A first hole communicating with the first port and a second hole selectively communicating with the second port are formed at the spool. A check valve is disposed at the second hole such that the selective communication between the second hole and the second port is controlled by the check valve.

The check valve may be realized by including a second spring abutted against an inside portion of the distributing chamber, a valve seat connected to the second spring for selectively opening the second hole, and a valve stem connected to the valve seat and penetrating the second hole. A hollow space is formed inside the spool, and a stopper is disposed in the hollow space for limiting a moving distance of the check valve.

The pressurized fluid generating unit may be realized by including a pressurized fluid generator for pressurizing fluid supplied from the master cylinder under control of the control unit, and a hydraulic-input control valve unit for controlling supply of the pressurized fluid of the pressurized fluid generator to the hydraulic pressure distributing unit through a hydraulic input line.

The pressurized fluid generator may include a motor driven by control of the control unit and a hydraulic pump driven by the motor.

The pressurized fluid generating unit preferably includes an accumulator for accumulating the pressurized fluid supplied from the pressurized fluid generator, a first pressure detector for detecting hydraulic pressure of the pressurized fluid supplied from the pressurized fluid generator to the hydraulic-input control valve unit, and a second pressure detector for detecting hydraulic pressure of the pressurized fluid supplied from the hydraulic-input control valve unit to the hydraulic pressure distributing unit.

The hydraulic-input control valve unit preferably includes a first hydraulic-input control valve and a second hydraulic-input control valve, where the first hydraulic-input control valve is disposed in the hydraulic pressure distributing unit on a hydraulic input line, the hydraulic input line communicating the pressurized fluid generator and the hydraulic pressure distributing unit, and the second hydraulic-input control valve is disposed in the pressurized fluid generator on the hydraulic input line. The first hydraulic-input control valve is preferably normally open and the second hydraulic-input control valve is preferably normally closed. The pressurized fluid generator unit further includes a hydraulic exhaust control valve for controlling exhaust of brake fluid from the hydraulic input line, and the hydraulic exhaust control valve is preferable normally open.

According to an alternative preferred embodiment, a brake system of the invention includes a master cylinder actuated in response to driver manipulation of a brake pedal. A plurality of wheel cylinders communicate with the master cylinder. A hydraulic pressure generating unit is provided separate from and in addition to the master cylinder. A control unit communicates with the hydraulic pressure generating unit to signal the generating unit to generate hydraulic pressure. A distributing unit communicates with the master cylinder, the hydraulic pressure generating unit and the wheel cylinders to distribute fluid there between. The wheel cylinders communicate with the master cylinder through the distributing unit and the distributing unit selectively provides hydraulic pressure to the wheel cylinders from one or both of the master cylinder and hydraulic pressure generating unit in response to user manipulation of the brake pedal and signals from the control unit.

In a further preferred embodiment, the distributing unit comprises a body defining a cavity. At least one piston member is disposed in the cavity to define a pressure chamber at one side of the piston member and a distributing chamber at an opposite side of said piston member. The hydraulic pressure generating unit communicates with the pressure chamber to provide pressurized hydraulic fluid thereto and the master cylinder communicates with the wheel cylinders through the distributing chamber. Additionally, an elastic member is disposed in the distributing chamber acting on the piston member in opposition to hydraulic pressure in the pressure chamber supplied by the generating unit. By this arrangement, hydraulic pressure to the wheel cylinders from the distributing chamber may be varied by changing pressure in the pressure chamber with the hydraulic pressure generating unit.

Further, the at least one piston member preferably defines an internal space through which the master cylinder communicates with the distributing chamber. A check valve is then preferably disposed between this internal space and the distributing chamber to control hydraulic fluid flow there between in response to the piston member position in the distributing chamber. More preferably, the distributing unit includes first and second piston members, distributing chambers and check valves disposed symmetrically around a central pressure chamber.

According to another preferred embodiment the pressure generating unit comprises a hydraulic pump with an inlet and an outlet. A first fluid line from the outlet communicates with the distributing unit. At least one supply control valve is disposed in the first fluid line to control fluid flow from the pump to the distributing unit. A second fluid line communicates between the distributing unit, the pump inlet and a fluid reservoir associated with the master cylinder. Preferably, at least one exhaust control valve is disposed in the second fluid line to control fluid flow from the distributing unit. More preferably, the second fluid line comprises a fluid exhaust line and a pump supply line. The fluid exhaust line communicates with the first fluid line between the at least one supply control valve and the distributing unit. The pump supply line communicates between the exhaust line and the pump inlet. Preferably, the at least one exhaust control valve is disposed in the fluid exhaust line between the first fluid line and the pump supply line. Also preferably, two fluid control vales are disposed in the first fluid line between the pump and the distributing unit.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
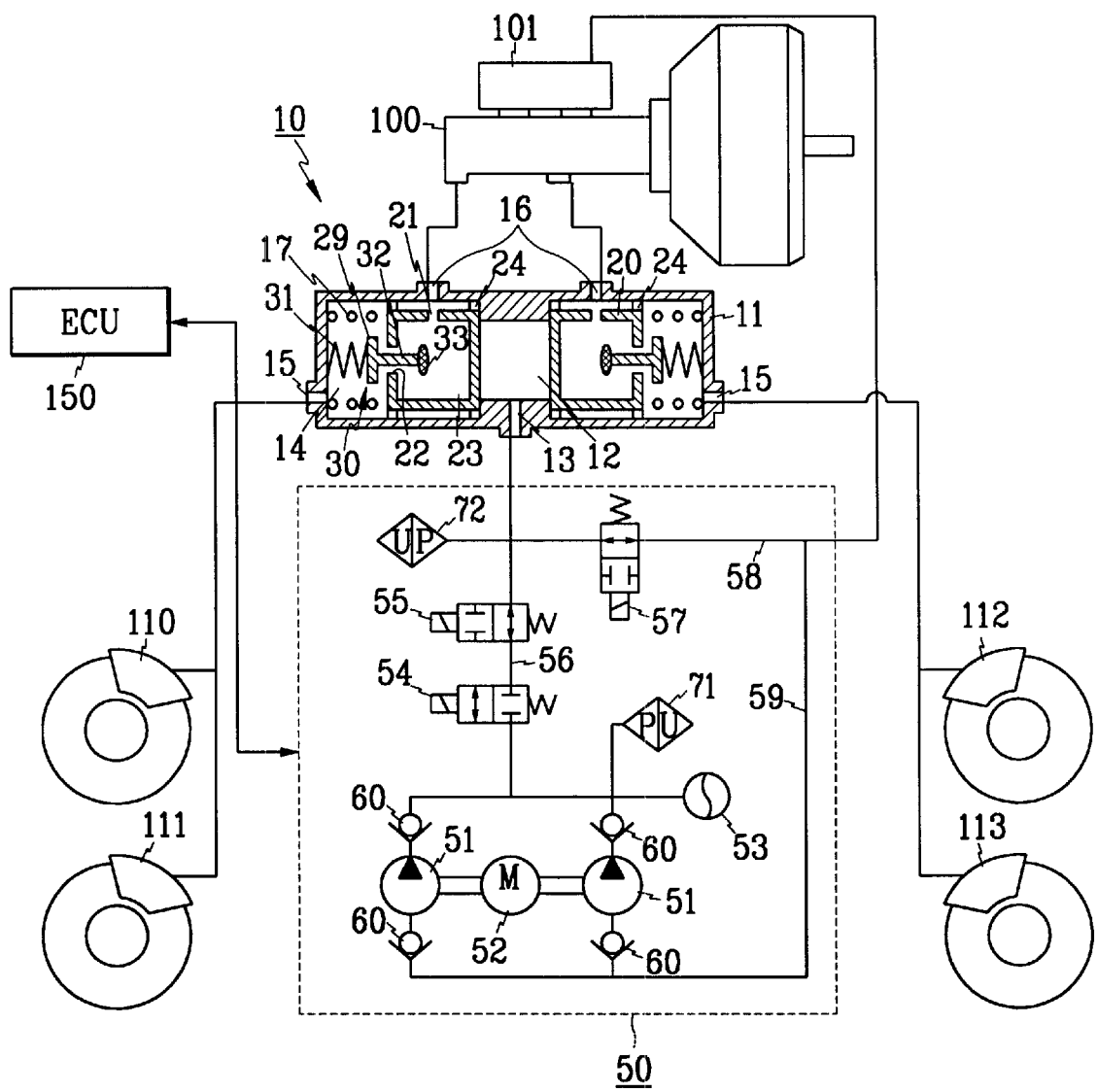
FIG. 1 is a schematic diagram of a hydraulic pressure control apparatus for a brake system of a vehicle according to a preferred embodiment of the present invention.
Figure 2:
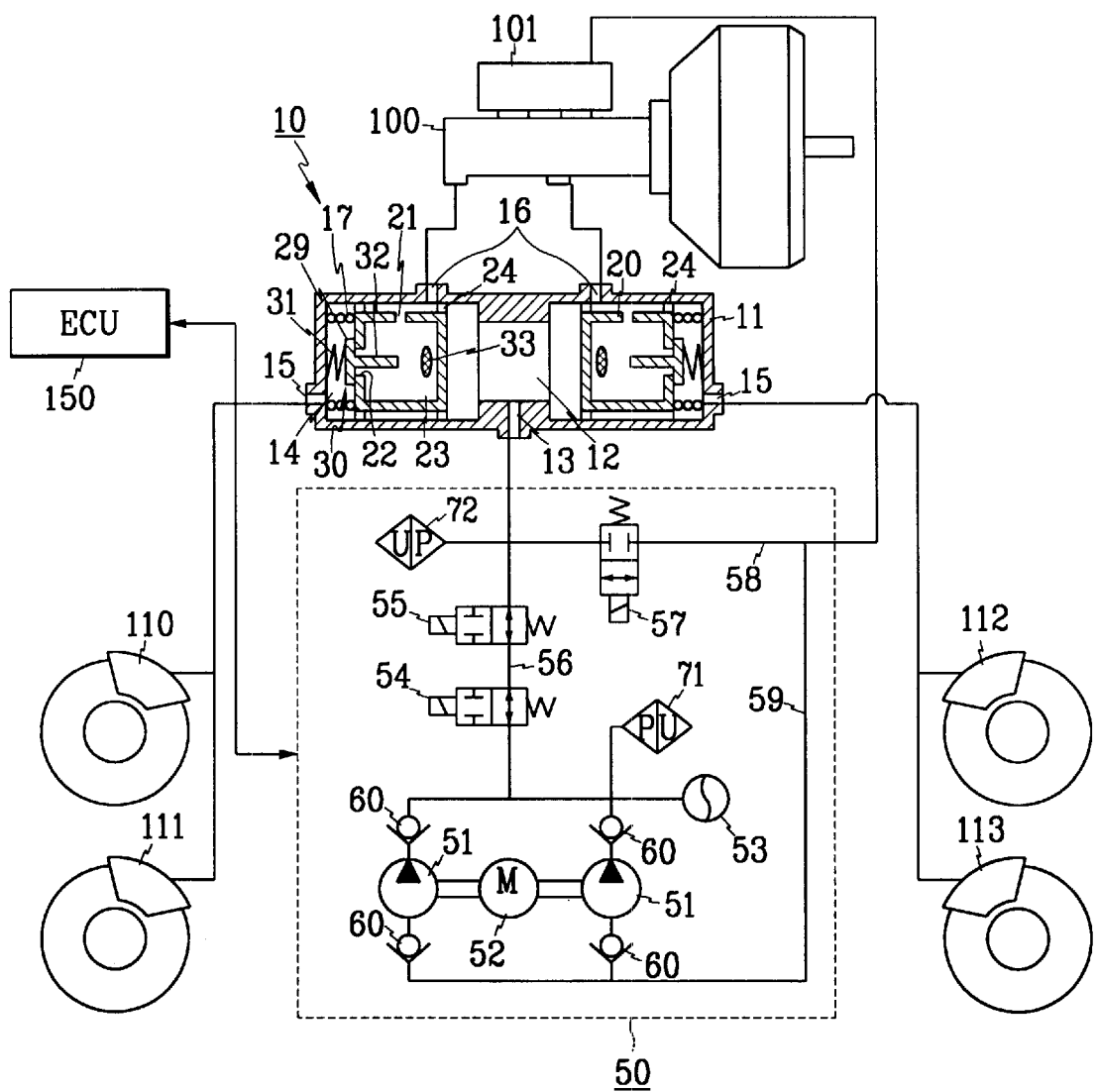
FIG. 2 is a schematic diagram showing operation of a hydraulic pressure control apparatus for a brake system of a vehicle according to a preferred embodiment of the present invention.

As shown in FIG. 1, the hydraulic pressure control apparatus for a brake system of a vehicle according to a preferred embodiment of the present invention includes hydraulic pressure distributing unit 10 and a pressurized fluid generating unit 50. Generating unit 50 pressurizes brake fluid for brake cylinders 110, 111, 112, and 113 of wheels according to control by electronic control unit (referred to as "ECU" hereinafter) 150. Hydraulic pressure distributing unit 10, disposed between the pressurized fluid generating unit 50 and the master cylinder 100, supplies hydraulic pressure of brake fluid to the brake cylinders 110–113 selectively from the pressurized fluid generating unit 50 and the master cylinder 100.

The pressurized fluid generating unit 50 includes a pressurized fluid generator comprising a motor 52 activated by control of the ECU 150, a hydraulic pump 51 activated by the motor 52. Accumulator 53 accumulates pressurized fluid supplied from the hydraulic pumps 51. A hydraulic-input control valve unit including a first and a second hydraulic-input control valve 55 and 54, disposed on a hydraulic input line 56 providing communication between the accumulator 53 and the pressurized fluid generator with the hydraulic pressure distributing unit 10, controls hydraulic pressure input to the hydraulic pressure distributing unit 10. A hydraulic exhaust control valve 57, disposed on a hydraulic exhaust line 58 branched from the hydraulic input line 56 to a reservoir 101, controls hydraulic pressure exhausted to the reservoir 101.

The hydraulic exhaust line 58 is also connected to the hydraulic pumps 51 through a hydraulic supply line 59 to supply brake fluid thereto. A check valve 60 is disposed at each of the hydraulic input line 56 and the hydraulic supply line 59 such that the brake fluid flows in only one direction.

As shown in FIG. 1, the first hydraulic-input control valve 55 is normally open, that is, open when not activated, while second hydraulic-input control valve 54 is normally closed. The hydraulic exhaust control valve 57 is normally open.

Hydraulic pressure supplied to the second hydraulic-input control valve 54 is detected by a first pressure detector 71 and the detected value is provided to the ECU 150. Hydraulic pressure supplied from the first hydraulic-input control valve 55 to the hydraulic pressure distributing unit 10 is detected by a second pressure detector 72 and the detected value is also provided to the ECU 150.

The hydraulic pressure distributing unit 10 includes a body 11 forming the housing of the hydraulic pressure distributing unit 10; a pressure chamber 12 disposed inside the body 10 and connected, through a first port 13, to the hydraulic input line 56 of the pressurized fluid generating unit 50. Distributing chambers 14, formed at both sides of the pressure chamber 12, are connected to the brake cylinders 110-113 and the master cylinder 100 through second and third ports 15 and 16, respectively. A spool 20 is slidably located in each distributing chamber 14 such that the first, second, and third ports 13, 15, and 16 are separated by the spools 20.

Distributing unit 10 further includes first springs 17, each located between an exterior surface of one spool 20 and an interior surface of the associated distributing chamber 14 such that each first spring 17 forces the associated spool 20 toward the pressure chamber 12. A first hole 21 and a second hole 22 are formed on a circumference and an end surface of each spool 20, respectively, such that the second and third ports 15 and 16 can communicate with each other through the first and second holes 21 and 22.

A check valve 30 is disposed at the second hole 22 of each spool 20 such that communication between the second hole 22 and the second port 15 is controlled by the check valve 30. Check valve 30 functions as a one-way valve to permit hydraulic pressure to be supplied only in the direction of the master cylinder 100 to the brake cylinders 110–113.

A hollow space 23 is formed inside the spool 20, and a sealing ring 24 is provided around each circumferential end of the spool 20 such that each distributing chamber 14 is divided into two portions, one toward the brake cylinders 110- 113 and the other toward the master cylinder 100. Furthermore, first hole 21 is formed at the spool 20 such that the hollow space 23 always communicates with the third port 16, and the hollow space 23 selectively communicates with the second port 15 according to the operation of the check valve 30.

Second springs 31 abutted against an interior surface of each distributing chamber 14 forces a valve seat 29 of the associated check valve 30 toward the second hole 22, and a valve stem 32 connected to the valve seat 29 penetrates the second hole 22. A stopper 33, disposed in the hollow space 23, limits a moving distance of the check valve 30 such that the second hole 22 is opened when each spool 20 is fully displaced toward the pressure chamber 12.

The operation of the hydraulic pressure control apparatus according to the preferred embodiment of this invention is hereinafter described in detail.

When a distance control system is not operating, that is, when the hydraulic pressure control apparatus of the present embodiment is not operating, the ECU 150 closes the first and second hydraulic-input control valves 55 and 54 and opens the hydraulic exhaust control valve 57 as shown in FIG. 1.

Therefore, the pressurized fluid in the pressure chamber 12 is exhausted to the reservoir 101 through the hydraulic exhaust line 58 and spools 20 slide toward the pressure chamber 12 by the elastic force of first springs 17. Check valves 30 also move by the elastic force of second springs 31, however movement is limited by stopper 33, and therefore second holes 22 are opened even if initially closed.

When a brake pedal (not shown) is operated, hydraulic pressure from brake fluid in the master cylinder 100 is transmitted into the hollow space 23 of each spool 20 through third ports 16 and first holes 21. Pressure is subsequently transmitted into each distributing chamber 14 through opened second holes 22, and is therefore supplied to brake cylinders 110–113 through second ports 15 such that the vehicle equipped with the hydraulic pressure control apparatus decelerates.

When the ECU 150 activates the motor 52 and accordingly the hydraulic pump 51 is operated, pressurized fluid expelled from the hydraulic pump 51 is accumulated in the accumulator 53 to a predetermined pressure, and is also supplied toward the pressure chamber 12 through the first port 13. The ECU 150 also closes the hydraulic exhaust line 58 by activating the hydraulic exhaust control valve 57, and opens the hydraulic input line 56 by sequentially opening the second and first hydraulic-input control valves 55 and 54. Therefore the pressurized brake fluid flows into the pressure chamber 12.

As the pressurized fluid flows into the pressure chamber 12, spools 20 are forced to symmetrically move against the elastic force of first springs 17. As this happens, each check valve 30 closes each second hole 22. Brake fluid in each distributing chamber 14 is therefore pressurized and expelled toward the brake cylinders 110–113 through the second port 15. Thus, the brake cylinders 110–113 are operated and the vehicle decelerates.

When the hydraulic pressure of the brake cylinders 110–113 is to be reduced, the ECU 150 activates the first hydraulic-input control valve 55 to close the hydraulic input line 56 and opens the hydraulic exhaust control valve 57 on the hydraulic exhaust line 58.

Because the pressurized fluid flowing from the accumulator 53 into the pressure chamber 12 is accordingly stopped and the pressure chamber 12 communicates with the reservoir 101 through the hydraulic exhaust line 58, the spools 20 are forced by first springs 17 to move toward the pressure chamber 12. Accordingly, pressurized fluid in the brake cylinders 110–113 flows into distributing chambers 14 through the second ports 15, and the fluid in the pressure chamber 12 is exhausted to the reservoir 101 through the hydraulic exhaust line 58.

When the brake pedal (not shown) is operated while the hydraulic pressure is being controlled, the resultant hydraulic pressure of the brake pedal operation can also be transmitted to the brake cylinders. That is, when the brake pedal is operated, the resultant hydraulic pressure is transmitted into hollow spaces 23 of spools 20 through third ports 16 and first holes 21 such that the resultant hydraulic pressure applies a force on check valves 30. Therefore,if the resultant hydraulic pressure exceeds a predetermined level (an elastic force level of the second spring 31 forcing the valve seat 29 toward spools 20), check valves 30, and accordingly second holes 22 are opened. Because third ports 16 and second ports 15 consequently communicate with each other through hollow spaces 23 and distributing chambers 14, the pressurized fluid inflow from the master cylinder 100 is expelled toward the brake cylinders 110–113 through the second port 15.

As described above, the driver does not lose control of the brake system because the hydraulic pressure resulting from operation of the brake pedal is still transmitted to the brake cylinders. Thus, according to the invention, the structure of the hydraulic control system is simplified and mechanicalized such that reliability and precision of its operation is improved, and further, the cost for manufacturing the system is reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic pressure control apparatus for a brake system including a master cylinder supplying fluid to wheel brake cylinders, the apparatus comprising:

a control unit for controlling operation of the hydraulic pressure control apparatus;

a pressurized fluid generating unit for pressurizing brake fluid and supplying the pressurized fluid; and a hydraulic pressure distributing unit for mechanically selecting and transmitting at least one of hydraulic pressure of the pressurized fluid supplied from the pressurized fluid generating unit and hydraulic pressure supplied from the master cylinder of the brake system to the wheel brake cylinders of the brake system, wherein the hydraulic pressure distributing unit comprises:

a pressure chamber for receiving pressurized fluid from the pressurized fluid generating unit;

a distributing chamber adjoining the pressure chamber, to which the master cylinder is connected by a first port and a brake cylinder is connected by a second port; and a spool disposed in the distributing chamber for transmitting hydraulic pressures of the pressure chamber and the master cylinder to the second port, wherein the spool is operated by pressure from the pressure chamber and an elastic force from a first elastic member abutted against an inside portion of the distributing chamber; and a first hole always communicating with the first port and a second hole selectively communicating with the second port are formed at the spool, where a check valve is disposed at the second hole such that the selective communication between the second hole and the second port is controlled by the check valve wherein the check valve comprises:

a second spring abutted against an inside portion of the distributing chamber;

a valve seat connected to the second spring for selectively opening the second hole; and a valve stem connected to the valve seat and penetrating the second hole.

2. The hydraulic pressure control apparatus of claim 1 wherein a hollow space is formed inside the spool, and wherein the hydraulic pressure control apparatus further comprises a stopper, disposed in the hollow space, for limiting a moving distance of the check valve.

3. A hydraulic pressure control apparatus for a brake system including a master cylinder supplying fluid to wheel brake cylinders, the apparatus comprising:

a control unit for controlling operation of the hydraulic pressure control apparatus;

a pressurized fluid generating unit for pressurizing brake fluid and supplying the pressurized fluid; and a hydraulic pressure distributing unit for mechanically selecting and transmitting at least one of hydraulic pressure of the pressurized fluid supplied from the pressurized fluid generating unit and hydraulic pressure supplied from the master cylinder of the brake system to the wheel brake cylinders of the brake system wherein the pressurized fluid generating unit comprises:

a pressurized fluid generator for pressurizing fluid supplied from the master cylinder under control of the control unit; and a hydraulic-input control valve unit for controlling supply of the pressurized fluid of the pressurized fluid generator to the hydraulic pressure distributing unit through a hydraulic input line.

4. The hydraulic pressure control apparatus of claim 3 wherein the pressurized fluid generator comprises a motor driven by control of the control unit and a hydraulic pump driven by the motor.

5. The hydraulic pressure control apparatus of claim 3 wherein the pressurized fluid generating unit further comprises an accumulator for accumulating the pressurized fluid supplied from the pressurized fluid generator.

6. The hydraulic pressure control apparatus of claim 3 wherein the pressurized fluid generating unit further comprises:

a first pressure detector for detecting hydraulic pressure of the pressurized fluid supplied from the pressurized fluid generator to the hydraulic-input control valve unit; and a second pressure detector for detecting hydraulic pressure of the pressurized fluid supplied from the hydraulic-input control valve unit to the hydraulic pressure distributing unit.

7. The hydraulic pressure control apparatus of claim 3 wherein the hydraulic-input control valve unit comprises a first hydraulic-input control valve and a second hydraulic-input control valve, the first hydraulic-input control valve being disposed to the hydraulic pressure distributing unit on the hydraulic input line, the hydraulic input line communicating the pressurized fluid generator and the hydraulic pressure distributing unit, and the second hydraulic-input control valve being disposed to the pressurized fluid generator on the hydraulic input line.

8. The hydraulic pressure control apparatus of claim 7 wherein the first hydraulic-input control valve is normally open and the second hydraulic-input control valve is normally closed.

9. The hydraulic pressure control apparatus of claim 3 wherein the pressurized fluid generating unit further comprises a hydraulic exhaust control valve for controlling exhaust of brake fluid from the hydraulic input line.

10. The hydraulic pressure control apparatus of claim 9 wherein the hydraulic exhaust control valve is normally opened.

11. A brake system, comprising:

a master cylinder actuated in response to driver manipulation of a brake pedal;

a plurality of wheel cylinders communicating with the master cylinder;

a hydraulic pressure generating unit separate from said master cylinder;

a control unit communicating with said generating unit to signal the generating unit to generate hydraulic pressure; and a distributing unit communicating with the master cylinder, the hydraulic pressure generating unit and said wheel cylinders, said wheel cylinders communicating with the master cylinder through the distributing unit, wherein the distributing unit selectively provides hydraulic pressure to the wheel cylinders from one or both of the master cylinder and hydraulic pressure generating unit in response to user manipulation of the brake pedal and signals from the control unit, wherein said distributing unit comprises:

a body defining a cavity;

at least one piston member disposed in said cavity to define a central pressure chamber at one side of the piston member and a distributing chamber at an opposite side of said piston member, wherein the hydraulic pressure generating unit communicates with the pressure chamber to provide pressurized hydraulic fluid thereto and the master cylinder communicates with the wheel cylinders through said distributing chamber; and an elastic member disposed in said distributing chamber acting on said piston member in opposition to hydraulic pressure in said pressure chamber supplied by said generating unit, whereby hydraulic pressure to the wheel cylinders from said distributing chamber may be varied by changing pressure in the pressure chamber with said generating unit, wherein:

said at least one piston member defines an internal space through which the master cylinder communicates with the distributing chamber;

a check valve is disposed between said internal space and distributing chamber to control hydraulic fluid flow there between in response to the piston member position in said distributing chamber; and said distributing unit includes first and second piston members, distributing chambers and check valves disposed symmetrically around the central pressure chamber.

12. A brake system, comprising:

a master cylinder actuated in response to driver manipulation of a brake pedal;

a plurality of wheel cylinders communicating with the master cylinder;

a hydraulic pressure generating unit separate from said master cylinder;

a control unit communicating with said generating unit to signal the generating unit to generate hydraulic pressure; and a distributing unit communicating with the master cylinder, the hydraulic pressure generating unit and said wheel cylinders, said wheel cylinders communicating with the master cylinder through the distributing unit, wherein the distributing unit selectively provides hydraulic pressure to the wheel cylinders from one or both of the master cylinder and hydraulic pressure generating unit in response to user manipulation of the brake pedal and signals from the control unit, wherein said pressure generating unit comprises:

a hydraulic pump with an inlet and an outlet, a first fluid line from said outlet communicating with said distributing unit;

at least one supply control valve disposed in said first fluid line to control fluid flow from said pump to said distributing unit;

a second fluid line communicating between the distributing unit, the pump inlet and a fluid reservoir associated with the master cylinder; and at least one exhaust control valve disposed in said second fluid line to control fluid flow from said distributing unit.

13. The brake system according to claim 12, wherein said second fluid line comprises:

a fluid exhaust line communicating with said first fluid line between said at least one supply control valve and the distributing unit; and a pump supply line communicating between said exhaust line and said pump inlet, wherein said at least one exhaust control valve is disposed in said fluid exhaust line between the first fluid line and the pump supply line.

14. The brake system according to claim 12, wherein two fluid control valves are disposed in the first fluid line between said pump and distributing unit.

15. A distributing unit for a brake system, wherein the distributing unit communicates with a master cylinder, a hydraulic pressure generating unit and plural wheel cylinders, said distributing unit comprising:

a body defining a cavity;

first and second piston members disposed in said cavity to define a central pressure chamber there between and distributing chambers at an opposite side of each said piston member, each piston member defining an internal space;

an elastic member disposed in each said distributing chamber acting on said piston members in opposition to hydraulic pressure in said central pressure chamber, whereby hydraulic pressure from said distributing chambers may be varied by changing pressure in the central pressure chamber; and a check valve disposed between each said internal space and distributing chamber to control hydraulic fluid flow there between in response to the piston member position in said distributing chamber, wherein the distributing unit selectively provides hydraulic pressure to the wheel cylinders from one or both of the master cylinder and hydraulic pressure generating unit in response to user manipulation of a brake pedal.

* * * * *